United States Patent
Hsu et al.

(10) Patent No.: US 10,191,811 B2
(45) Date of Patent: Jan. 29, 2019

(54) DUAL BOOT COMPUTER SYSTEM

(71) Applicant: Quanta Computer Inc., Taoyuan (TW)

(72) Inventors: Chih-Liang Hsu, Taoyuan (TW);
Wei-Liang Cheng, Taoyuan (TW);
Ying-Chin Huang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 151 days.

(21) Appl. No.: 14/825,864

(22) Filed: Aug. 13, 2015

(65) Prior Publication Data
US 2017/0046229 A1 Feb. 16, 2017

(51) Int. Cl.
*G06F 11/14* (2006.01)
*G06F 9/4401* (2018.01)

(52) U.S. Cl.
CPC ........ *G06F 11/1417* (2013.01); *G06F 9/4401* (2013.01); *G06F 9/441* (2013.01); *G06F 2201/805* (2013.01); *G06F 2201/85* (2013.01)

(58) Field of Classification Search
CPC ............... G06F 11/1417; G06F 9/4401; G06F 2201/805; G06F 2201/85
See application file for complete search history.

(56) References Cited

U.S. PATENT DOCUMENTS

| | | | | |
|---|---|---|---|---|
| 5,136,711 A * | 8/1992 | Hugard | .................... | G06F 9/441 710/74 |
| 6,205,548 B1 * | 3/2001 | Hasbun | ..................... | G06F 8/65 711/170 |
| 6,247,126 B1 * | 6/2001 | Beelitz | ..................... | G06F 8/63 713/1 |
| 6,308,264 B1 * | 10/2001 | Rickey | .................. | G06F 9/4406 713/100 |
| 6,421,792 B1 * | 7/2002 | Cromer | ............... | G06F 11/1417 713/2 |
| 6,584,561 B1 * | 6/2003 | Merkin | .................. | G06F 21/575 713/2 |
| 6,754,818 B1 * | 6/2004 | Lee | ......................... | G06F 9/4406 713/1 |

(Continued)

FOREIGN PATENT DOCUMENTS

| | | |
|---|---|---|
| TW | 200951812 A | 12/2009 |
| TW | 447583 B | 8/2014 |
| TW | 201447757 A | 12/2014 |

OTHER PUBLICATIONS

Taiwanese Office Action 104144398 dated Oct. 14, 2016 w/ First Office Action Summary.

*Primary Examiner* — Paul Contino
(74) *Attorney, Agent, or Firm* — Nixon Peabody LLP; Eduardo J. Quiñones; Zhou Lu

(57) ABSTRACT

A system of booting a computer in which a pair of boots (or dual boots) is provided in the flash memory of the computer. The first flash boot, also called the primary boot, is activated when the computer is turned on, after the POST (Power on Self-Test). The primary boot determines if a secondary boot is stored in the flash memory of the computer. If the secondary boot is not stored in the flash memory of the computer, the primary boot resumes and the computer is booted using the primary boot. If a secondary boot is stored in the flash memory of the computer, the primary boot resumes and is completed, after which the computer is reset and rebooted using the secondary boot.

20 Claims, 9 Drawing Sheets

(56) References Cited

U.S. PATENT DOCUMENTS

| | | | | |
|---|---|---|---|---|
| 6,754,855 B1* | 6/2004 | Denninghoff | G06F 9/4406 | 714/25 |
| 6,859,876 B2* | 2/2005 | Dykes | G06F 9/4406 | 713/2 |
| 7,024,581 B1* | 4/2006 | Wang | G06F 11/1417 | 713/2 |
| 7,206,971 B2* | 4/2007 | Zeller | G06F 11/1417 | 714/32 |
| 7,315,940 B1* | 1/2008 | Audette | G06F 11/1417 | 713/1 |
| 7,340,595 B2* | 3/2008 | Blinick | G06F 11/1417 | 713/1 |
| 7,870,378 B2* | 1/2011 | Kuo | G06F 9/4403 | 365/189.2 |
| 7,900,036 B2* | 3/2011 | Abe | G06F 11/073 | 713/1 |
| 8,443,203 B2* | 5/2013 | Park | G06F 21/575 | 713/187 |
| 8,914,627 B2* | 12/2014 | Park | H04L 9/3242 | 713/2 |
| 9,378,372 B2* | 6/2016 | Kim | G06F 21/575 | |
| 9,959,125 B2* | 5/2018 | Siluvainathan | G06F 8/654 | |
| 2002/0087855 A1* | 7/2002 | Dykes | G06F 9/4406 | 713/2 |
| 2002/0147784 A1* | 10/2002 | Gold | H04L 67/1008 | 709/208 |
| 2005/0015652 A1* | 1/2005 | Han | G06F 11/1458 | 714/6.11 |
| 2006/0155979 A1* | 7/2006 | Blinick | G06F 11/1417 | 713/2 |
| 2006/0236150 A1* | 10/2006 | Lintz, Jr. | G06F 11/1417 | 714/6.13 |
| 2007/0073978 A1* | 3/2007 | Lee | G06F 8/65 | 711/141 |
| 2008/0082814 A1* | 4/2008 | Kuo | G06F 11/1417 | 713/2 |
| 2008/0086629 A1* | 4/2008 | Dellow | G06F 9/4401 | 713/2 |
| 2008/0098257 A1* | 4/2008 | Blinick | G06F 11/1417 | 714/5.11 |
| 2008/0263345 A1* | 10/2008 | Booth | G06F 21/572 | 713/2 |
| 2009/0019275 A1* | 1/2009 | Park | G06F 21/575 | 713/2 |
| 2009/0240934 A1* | 9/2009 | Chou | G06F 11/1417 | 713/2 |
| 2009/0300343 A1* | 12/2009 | Lan | G06F 9/44505 | 713/2 |
| 2010/0205423 A1* | 8/2010 | Shao | G06F 11/1417 | 713/2 |
| 2011/0258425 A1* | 10/2011 | Galbo | G06F 9/4401 | 713/2 |
| 2012/0117367 A1* | 5/2012 | Lu | G06F 9/4401 | 713/2 |
| 2012/0137027 A1* | 5/2012 | Zheng | G06F 11/3041 | 710/19 |
| 2012/0191960 A1* | 7/2012 | Piwonka | G06F 9/441 | 713/2 |
| 2012/0210115 A1* | 8/2012 | Park | H04L 9/3242 | 713/2 |
| 2013/0036300 A1* | 2/2013 | Baik | G06F 9/4401 | 713/2 |
| 2013/0047031 A1* | 2/2013 | Tabone | G06F 11/1417 | 714/15 |
| 2013/0173952 A1* | 7/2013 | Gao | G06F 9/4406 | 714/3 |
| 2013/0212368 A1* | 8/2013 | Peng | G06F 9/4406 | 713/2 |
| 2014/0089651 A1* | 3/2014 | Yao | H04L 9/3247 | 713/2 |
| 2014/0115354 A1* | 4/2014 | Jabbaz | H04L 12/10 | 713/310 |
| 2014/0129820 A1* | 5/2014 | Lim | G06F 9/4401 | 713/2 |
| 2014/0181492 A1* | 6/2014 | Chen | G06F 9/4401 | 713/2 |
| 2014/0281452 A1* | 9/2014 | Friedman | G06F 11/1417 | 713/2 |
| 2014/0281466 A1* | 9/2014 | Samuel | G06F 9/4408 | 713/2 |
| 2014/0372676 A1* | 12/2014 | Lee | G06F 9/4411 | 711/103 |
| 2015/0089486 A1* | 3/2015 | Lin | G06F 8/665 | 717/168 |
| 2015/0347154 A1* | 12/2015 | Friedman | G06F 9/4401 | 713/2 |
| 2016/0085558 A1* | 3/2016 | Anbazhagan | G06F 8/654 | 713/2 |
| 2017/0046229 A1* | 2/2017 | Hsu | G06F 11/1417 | |
| 2017/0286128 A1* | 10/2017 | Yang | G06F 8/654 | |
| 2018/0096151 A1* | 4/2018 | Ghetie | G06F 21/575 | |

\* cited by examiner

DUAL BOOT COMPUTER SYSTEM

TECHNICAL FIELD

Embodiments of the system and method generally related to computer boot systems. More specifically, embodiments of the system and method generally relates to computer boot systems with a primary and a secondary boot.

BACKGROUND

A computer with a single boot code typically boots from flash memory located on the computer. If that single boot code is damaged, the computer cannot boot properly. Boot code can be damaged is modified to the extent that it no longer functions. This typically requests contacting the manufacturer for assistance or returning the computer. The manufacturer can then provide a replacement boot code, which is inconvenient both for the purchaser and the manufacturer.

SUMMARY

This disclosure provides a system of booting a computer in which a pair of boots (or dual boots) is provided in the flash memory of the computer. The first flash boot, also called the primary boot, is activated when the computer is turned on, after the POST (Power on Self-Test). The primary boot determines if a secondary boot is stored in the flash memory of the computer. If the secondary boot is not stored in the flash memory of the computer, the primary boot resumes and the computer is booted using the primary boot. If a secondary boot is stored in the flash memory of the computer, the primary boot resumes and is completed, after which the computer is reset and rebooted using the secondary boot.

In an embodiment of the disclosure, the primary boot is locally secured, meaning that only the manufacturer has access to the primary boot. This security is in place in order to ensure that the computer can boot at least using the primary boot, in the event the secondary boot is corrupted, unstable, or otherwise unusable. The security can take many forms, including but not limited to password access, security key access, or other types of security known to those of skill in the art. The security of the primary boot prevents user apart from the manufacturer from accessing the primary boot. The primary boot can be installed at the time of manufacture, or it can be installed or updated later, such as during a maintenance period. Alternatively, the primary boot can be modified remotely via a network, such as during a manufacturer update. The computer can be booted using the primary boot.

In an embodiment of the disclosure, the secondary boot is modifiable, such as by a user. The secondary boot includes an Open Network Installation Environment (ONIE), which allows the user to modify the secondary boot by including sections such as the ONIE boot code, boot environment, and ONIE kernel, as well as other user-modifiable sections. The computer can be booted using the secondary boot as well as the primary boot. The secondary boot can also be updated via a network or other remote source.

In an embodiment of the disclosure, the computer boots with the primary boot. The primary boot determines if the secondary boot is stored in the computer flash memory. If there is no secondary boot present in flash memory, such as if the computer is new, and the user has not yet created/modified/installed the secondary boot, the primary boot continues. Alternatively, the user may have deleted the secondary boot, either intentionally or unintentionally. In either case, the primary boot continues. A variety of peripheral devices can be activated before the primary boot is completed.

In an embodiment of the disclosure, the computer boots with the primary boot. The primary boot determines if the secondary boot is stored in the computer flash memory. If there is a secondary boot present in flash memory, the primary boot records this information. The primary boot continues. A variety of peripheral devices can be activated before the primary boot is completed. Once the primary boot is completed, the system resets and reboots using the secondary boot. Since the primary boot completed earlier in this embodiment, the variety of peripheral devices that were activated during the primary boot may not be required to be activated again during the secondary boot, saving time and resources during the secondary boot.

In an embodiment of the disclosure, the computer boots with the primary boot, restarts the computer and boots using a second boot. A backup of the second boot is stored in a partition of the primary boot.

In an embodiment of the disclosure, the computer boots with the primary boot, restarts the computer and boots using a second boot. Two backups of the second boot is stored in a partition of the primary boot. The first backup of the second boot is tested or validated to insure that the first backup of the second boot is highly reliable due to the nature of its installation and corresponding diagnostic testing to boot the computer. The second backup of the second boot can be locally protected and can be modified by the user. The second backup of the second boot can be used to boot the computer. If the second backup of the second boot is unable to boot the computer, the first backup of the second boot can be used to boot the computer.

In an embodiment of the disclosure, the computer automatically selects which boot to use, either the primary boot or the secondary boot. The computer defaults to the primary boot, and either selects the primary boot or the secondary boot. No action is required by the user in this embodiment.

In an embodiment of the disclosure, the user may select which boot to use, either the primary boot or the secondary boot. A hardware jumper can be inserted into a designated position on the motherboard of the computer, for example and without limitation. The position of the jumper determines whether the primary boot or the secondary boot is completed when the computer is activated, after POST.

In an embodiment of the disclosure, the primary and/or secondary boots can be modified via a network or other remote source.

In an embodiment of the disclosure, the diagnostic code of the primary boot can be accessed either through the primary boot code and its kernel code or the diagnostic code of the primary boot can be accessed through directly through a hotkey on an input device.

In an embodiment of the disclosure, the secondary boot can be stored in a partition in the primary boot, storing such elements of the secondary boot as the ONIE u-boot code, the u-boot environment, and kernel code. The partition (the saved secondary boot) can be restored via a command, such as but not limited to a hotkey on an input device. Using the restoration, a user can restore the secondary code (the most recent operable version) to operation without servicing the computer and/or downloading the secondary code via a network.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Embodiments of this disclosure provide a system of booting a computer in which a pair of boots (or dual boots) is provided in the flash memory of the computer. A boot is a software module that is configured to load an operating system into the main memory of the computer upon computer restart. The first flash boot, also called the primary boot, is preferably activated when the computer is turned on, after the POST (Power on Self-Test). The primary boot determines if a secondary boot is present and available on the computer. If the secondary boot is not present and available the primary boot boots the computer and further computer operations are based off the primary boot. If a secondary boot is present and available, the primary boot completes, after which the computer is reset and rebooted with the secondary boot.

Figure 1:
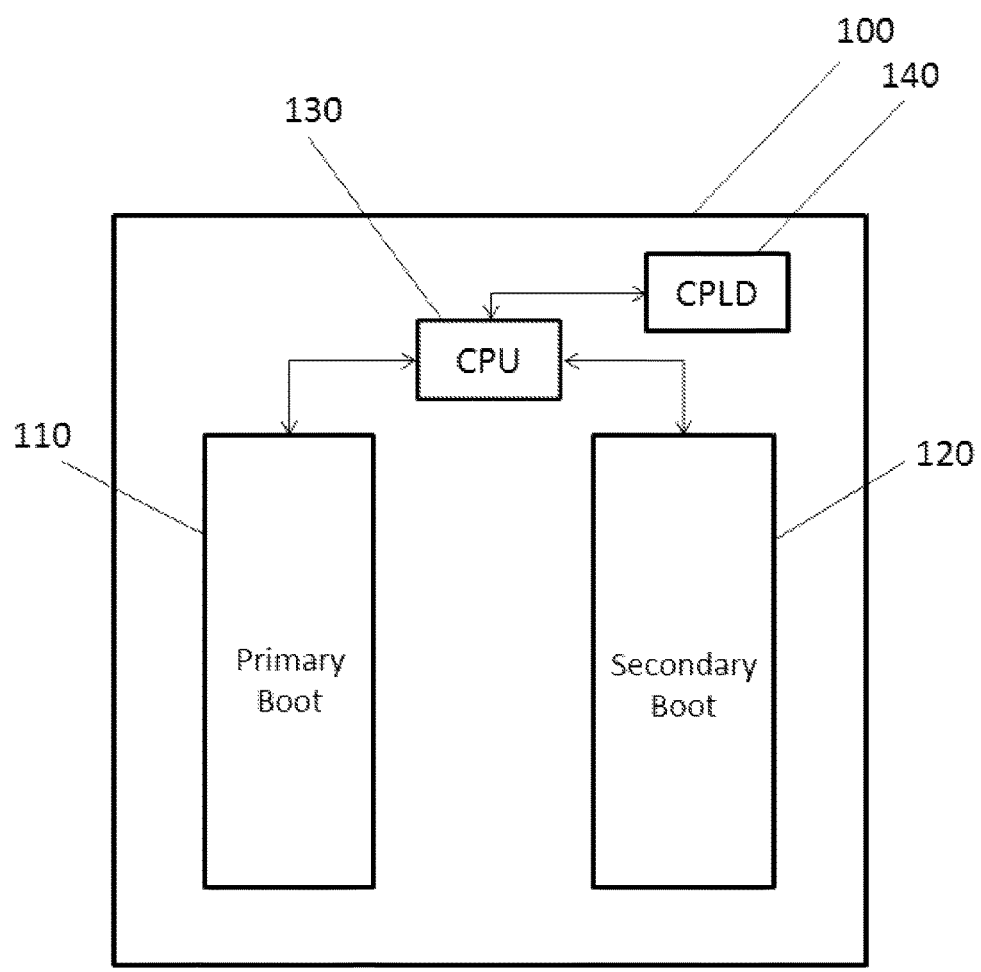
FIG. 1 is an exemplary diagram of an embodiment of the disclosure, in which a computer system is shown including a primary and secondary boot, connected to a CPU and CPLD.

FIG. 1 is an exemplary view of a dual boot for a computer system 100 according to an embodiment of the disclosure, in which the primary boot 110 and the secondary boot 120 is connected to a CPU or processor 130. A Complex Programmable Logic Device (CPLD) 140 is also connected to the CPU 130. The CPU 130 is connected to both the primary boot 110 and the secondary boot 120. The CPLD 140 is connected to the CPU 130, and controls the CPU 130 with regard to the selection of either the primary boot 110 or the secondary boot 120.

During the startup of the computer system 100, after the Power on Self-Test (POST) is completed, the primary boot 110 is selected by the CPLD 140 as the boot to use to boot up the computer system 100. This may be a default setting, or a more specific selection.

The CPLD 140 also determines if the secondary boot 120 is present and available in the computer system 100. The secondary boot 120 may, in some instances, not be present or available in the computer system 100. For example and without limitation, the secondary boot 120 may not be present because the computer system 100 is new and the secondary boot 120 may not have been created. By way of non-limiting example, the secondary boot may not be available due to some damage or other inoperability.

The primary boot 110 is preferably locally read only, in that the purchaser would not have direct access to modify or otherwise manipulate primary boot 110.

The secondary boot 120 is preferably a locally-modifiable boot, meaning that the secondary boot 120 can be created locally (e.g., by the purchasing user) to perform a variety of custom tasks and behaviors that may or may not coincide with the primary boot 110. Alternatively, the user may load a secondary boot 120 from an alternative source, such as via a network. The dual nature of the boots thus creates an environment in which the purchaser can manipulate the secondary boot 120 to their custom needs, yet still have a reliable fixed backup in case of failure that avoids having to contact the manufacturer or return the unit.

In some embodiments, the primary boot 110 and the secondary boot 120 may be similar or dissimilar. If the secondary boot 120 is present and available, the CPLD 140 instructs the computer system 100, through the CPU 130, to reboot using the secondary boot 120 once the primary boot sequence is complete.

The primary boot 110 continues, after the determination of the presence of the secondary boot 120 and the CPU 130 instruction to reboot with the secondary boot 120, activating a variety of devices that may be connected to the computer system, such as but not limited to peripheral devices such as video and audio cards, and input/output devices. By activating the variety of peripheral devices during the primary boot 110, the secondary boot 120 may skip these activations, or only activate additional peripheral devices not activated during the primary boot 110 thereby completing the secondary boot 120 more quickly and efficiently. Once the primary boot 110 ends, the computer system restarts, or reboots again starting with the primary boot 110. The CPLD 140 determines that the secondary boot 120 is present by checking the portion of the memory of the computer system 100 reserved for the secondary boot 120. The CPU then accesses the secondary boot 120, discontinues the primary boot 110, and boots the computer system 100.

As stated above, the secondary boot 120 may or may not be similar to the primary boot 110, however the object of the secondary boot 120 is the same as the primary boot 110—to successfully boot the computer system 100.

In some embodiments, if the secondary boot 120 is completed successfully, a copy or backup version of the secondary boot 120 is stored in a partition of the primary boot 110. If the secondary boot 120 is not completed successfully the computer system 100 may not store a copy or backup version of the secondary boot 120 in a partition of the primary boot 110. This can prevent a restoration of a version of the backup secondary boot 120 that may not boot the computer system 100. This can be useful, for example, when firmware for the computer system 100 is updated, and there can be compatibility issues with updated firmware and other existing firmware and/or components. By storing a backup version of the secondary boot 120 in a partition of the primary boot 110, the computer system 100 can be "rolled back" to an earlier secondary boot until the firmware update issue can be resolved.

Figure 2:
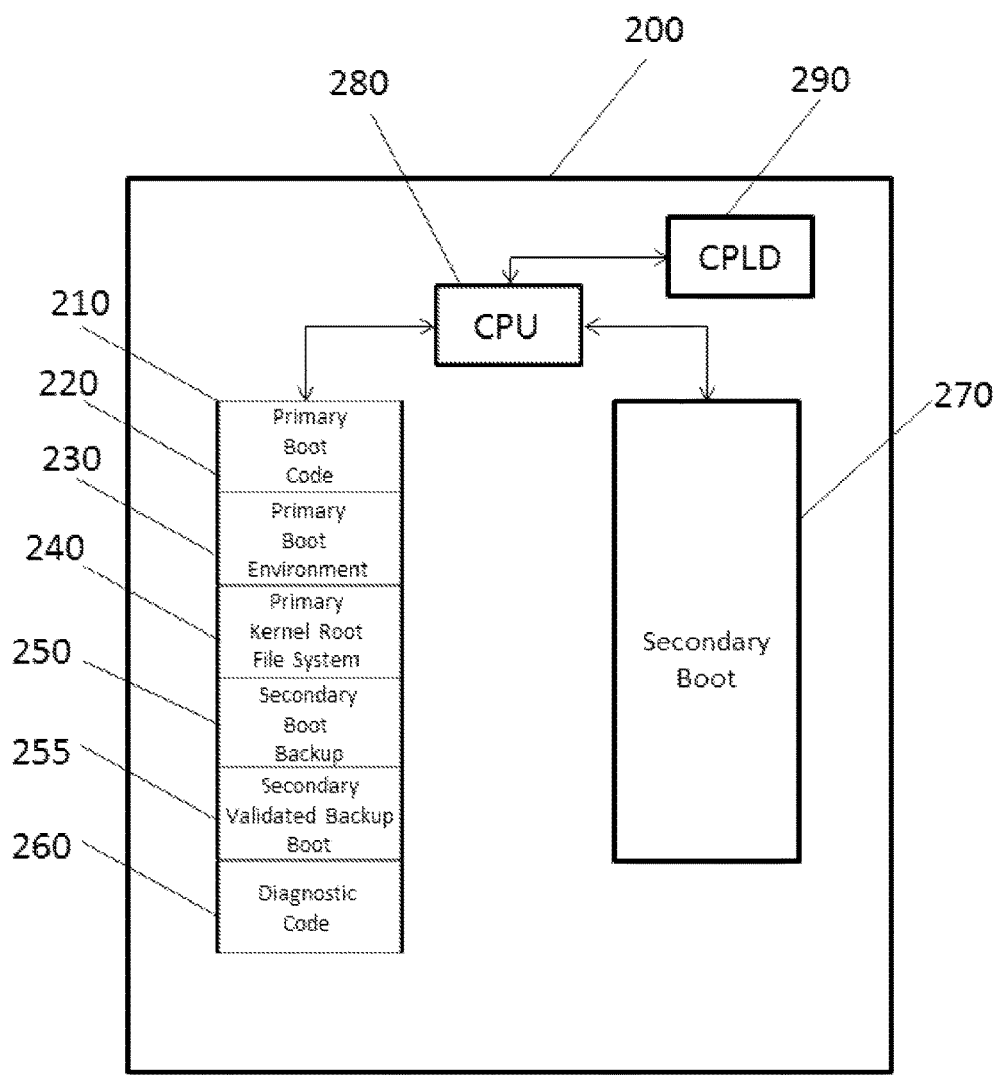
FIG. 2 is an exemplary diagram of an embodiment of the disclosure, in which a primary boot and its subcomponents are shown as well as a secondary boot, both connected to a CPU and a CPLD.

FIG. 2 is an exemplary view of a dual boot for a computer system 200 according to an embodiment of the disclosure, in which the primary boot 210 includes a variety of elements including the primary boot code 220, the primary boot environment 230, the primary kernel root file system 240, the secondary boot backup 250, secondary validated backup boot 255, and the diagnostic code 260. It should be understood that the primary boot 210 may contain additional elements and that the elements listed herein are only exemplary in nature and not limiting. The primary boot 210 and the secondary boot 270 are connected to the CPU or processor 280. The Complex Programmable Logic Device (CPLD) 290 is also connected to the CPU 280. The CPLD 290 is a programmable digital logic device that is simpler than a CPU or processor 280.

As shown in FIG. 2, the primary boot 210 includes the primary boot code 220 and the primary boot environment 230. The primary boot kernel root file system 240 selects the files necessary for the computer system 200 to run. The secondary boot backup 250 is also stored in the primary boot 210, preferably in a partition within the primary boot 210, is a copy of the last successful secondary boot 270 of the computer system 200. The secondary boot backup 250 is typically not accessible to a user of the computer system 200. The user can only access the secondary boot backup 250 using a password or security key (not shown) preferably maintained by an off-site authority, such as the manufacturer. In other words, the secondary boot backup 250 is locally protected.

The secondary boot backup 250 can replace the secondary boot 270 if the existing secondary boot 270 is corrupt/missing/or otherwise unusable. A user can retrieve the password or security key from an off-site authority, such as the manufacturer. By providing the requested information, the user can receive the password or security key to unlock the secondary boot backup 250 and overwrite the secondary boot 270 that is corrupt/missing/or otherwise unusable.

The secondary validated boot backup 255 can replace the secondary boot 270 if the existing secondary boot 270 is corrupt/missing/or otherwise unusable. This backup version of the secondary boot 270 is referred to as the secondary validated boot backup 255 since it is highly reliable due to the nature of its installation and corresponding diagnostic testing. For example, the secondary validated boot backup 255 can be tested using diagnostic tools or emulators to verify that the secondary validated boot 255.

As with the secondary boot backup 250, access to the secondary validated boot backup 255 can be limited or restricted, such as with a password. The user can retrieve the password or security key from an off-site authority, such as the manufacturer. By providing the requested information, the user can receive the password or security key to unlock the secondary validated boot backup 255; however this password or security may or may not be same as the password or security key to access the secondary boot backup 250.

Figure 3:
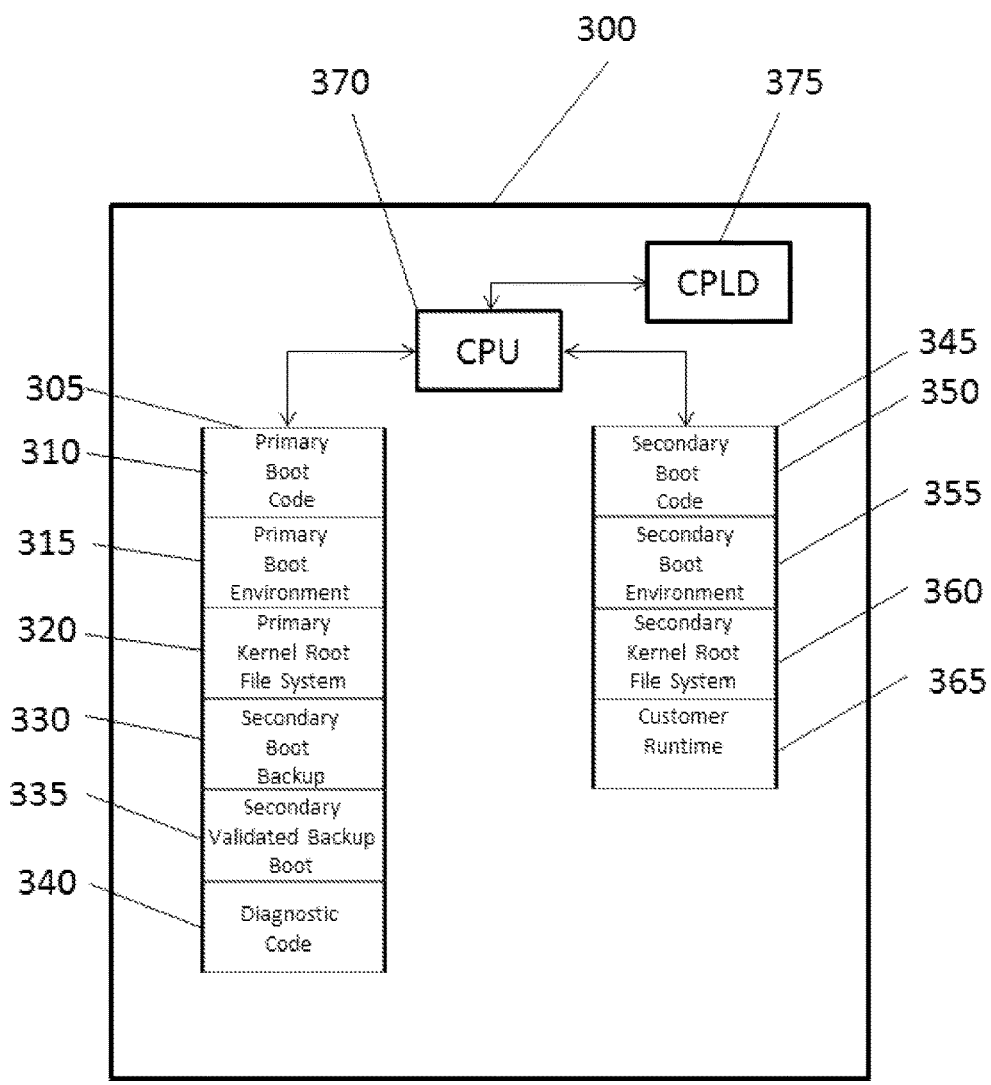
FIG. 3 is another exemplary diagram of an embodiment of the disclosure, in which a primary boot and its subcomponents and a secondary boot and its subcomponents are shown, both connected to a CPU and a CPLD.

FIG. 3 is an exemplary view of a dual boot system for a computer system 300 according to an embodiment of the disclosure, in which the primary boot 305 includes a variety of elements including the primary boot code 310, the primary boot environment 315, the primary kernel root file system 320, the secondary boot backup 330, secondary validated boot backup 335, and the diagnostic code 340. It should be understood that the primary code 305 may contain additional elements and that these elements are only exemplary in nature and not limiting. The secondary boot 345 includes a variety of elements including the secondary ONIE boot code 350, the secondary boot environment 355, and the secondary ONIE kernel root file system 360. A section of the secondary boot 345 is used for the customer runtime 365, which includes instructions relating to the operation of the computer system 300. The primary boot 305 and the secondary boot 345 are connected to the CPU or processor 370. The Complex Programmable Logic Device (CPLD) 375 is also connected to the CPU 370. The CPLD 375 is a programmable digital logic device that is simpler than a CPU or processor 370.

As shown in FIG. 3, the primary boot 305 includes the primary boot code 310. The primary boot code 310 contains the primary bootloader, and can also provide upgrades to the primary boot 305 and/or the secondary boot 345. A variety of hardware can be initialized using with the primary boot code 310, such as a serial real-time clock (DS1339) and General Purpose Input/Output (GPIO) pins. The primary boot environment 315 contains the stored primary boot code 310. The primary boot environment 315 can pass information to the primary boot kernel file system 320, such as MAC addresses, and MTD (Memory Technology Device) partition information. A user can access this information through the primary boot kernel file system 320. The primary boot kernel (root file system) 320 selects the files necessary for the operation of the computer system 300.

The secondary boot backup 330 may also be stored in the primary boot 305. In some embodiments, the secondary boot backup (ONIE Backup Code) 330 is stored in a partition within primary boot 305. The secondary boot backup 330 is copied from the last successful secondary boot 345 of the computer system 300.

In some embodiments, the secondary boot backup 330 is typically not accessible to the user of the computer system 300. The user can only access the secondary boot backup 330 using a password or security key (not shown). In other words, the secondary boot backup 330 is locally protected. The secondary boot backup 330 allows the computer system 300 to be rebooted if the existing secondary boot 345 is corrupt/missing/or otherwise unusable. The user can contact retrieve the password or security through a number of methods, such as by contacting the manufacturer via a network. By providing the requested information, the user can receive the password or security key from the manufacturer that unlocks the secondary boot backup 330 and copies it to the secondary boot 345 or allows it to be used from its current location in primary boot 305. The diagnostic code 340 in the primary boot 305 includes a variety of diagnostic tools used to perform maintenance of the computer system 300.

The secondary validated boot backup 335 can replace the secondary boot 345 if the existing boot 345 is corrupt/missing/or otherwise unusable. This backup version of the secondary boot 345 is referred to as the secondary validated boot backup since it is highly reliable due to the nature of its installation and corresponding diagnostic testing. For example, the secondary validated boot backup 335 can be tested using diagnostic tools or emulators.

As with the secondary boot backup 330, access to the secondary validated boot backup 335 can be limited or restricted, such as with a password. The user can retrieve the password or security key from an off-site authority, such as the manufacturer. By providing the requested information, the user can receive the password or security key to unlock the secondary validated boot backup 335; however this password or security may or may not be same as the password or security key to access the secondary boot backup 330.

Also in FIG. 3, the secondary boot 345 includes a variety of elements including the secondary ONIE boot code 350, the secondary boot environment 355, and the secondary ONIE kernel root file system 360. A section of the secondary boot 345 is used for the customer runtime 365, which includes instructions relating to the computer system of the user. At least these three elements are defined in ONIE, in other words, these elements are included in an Open Network Installation Environment and are user-modifiable. Additional elements may also be defined in ONIE, however. The user may modify these or additional elements in a variety of ways to suit a particular application or usage of the computer system 300. However, as detailed above, the user may end up modifying these elements to a situation where the computer system 300 may no longer boot using the secondary boot 345. As a result, the user may want to return to one of two secondary boot backup options. The first option can be the last successful version of the secondary boot 345, which is stored in the primary boot 305 as the secondary boot backup 330. The second option can be the last successful tested, or certified, version of the secondary boot 345, which is stored in the primary boot 305 as the secondary validated boot backup 335. When the secondary boot 345 is no longer functional or otherwise no longer performs as the user desires, the user can retrieve the secondary backup boot 330 or the secondary validated backup boot 335.

However, as explained above, the secondary backup boot 330 and the secondary validated boot backup 335 are not readily accessible. This arrangement prevents uncontrolled access of the secondary backup boot 330 and the secondary validated backup boot 335 and also prevents damage or improper modification. In order to access the secondary backup boot 330 or the secondary validated boot backup 335, a request for a password or security key from the manufacturer is required in order to access the secondary backup boot 330 or the secondary validated boot backup 335 from the primary boot 305. The request can be in a variety of methods, via a network or through electronic mail. For example, a visit to the webpage of the manufacturer, for example, to provide identifying information, and in return receive the password or security to unlock the secondary boot backup 330 or the secondary validated boot backup 335 from the primary boot 305. The secondary boot 345 also includes the customer runtime 365 which includes instructions relating to the computer system 300 of the customer. The primary boot 305 and the secondary boot 345 are connected to the CPU 370 and the CPLD 375, which controls the selection of the primary boot 305 or the secondary boot 345 when the computer boot sequence initializes.

As discussed above, but also included here for clarity, the computer system boot sequence initializes using the primary boot 305. The CPU 370 and the CPLD 375 determine the status of the secondary boot 345. For example, the secondary boot 345 may not be present, if the computer system is new and there is no secondary boot 345. If the secondary boot 345 is not present and available, the primary boot 305 is completed. If the secondary boot 345 is present and available, the CPLD 375 instructs the CPU to reboot using the secondary boot 345 after finishing the primary boot 305. If during the reboot using the secondary boot 345, the computer system 300 does not reboot successfully, the secondary boot backup 330 can be started using CTRL-R, for example.

In an alternate embodiment, if during the reboot using the secondary boot 345, the computer system 300 does not reboot successfully, the process of retrieving the password or security key to access the secondary boot backup 330 can be started as detailed above.

Also shown in FIG. 3, the secondary boot 345 includes the stored ONIE bootloader (for boot code). The secondary boot environment 355 allows the user to modify the secondary boot by including sections such as the secondary boot code 350 and secondary boot kernel root file system 360, as well as other customer-modifiable sections. The secondary boot kernel root file system 360 can include a stored user-modified ONIE kernel and root file system. A kernel shell environment can also be present and can be accessed by the customer. The secondary boot runtime 365 can include stored user switch operating system code.

Figure 4:
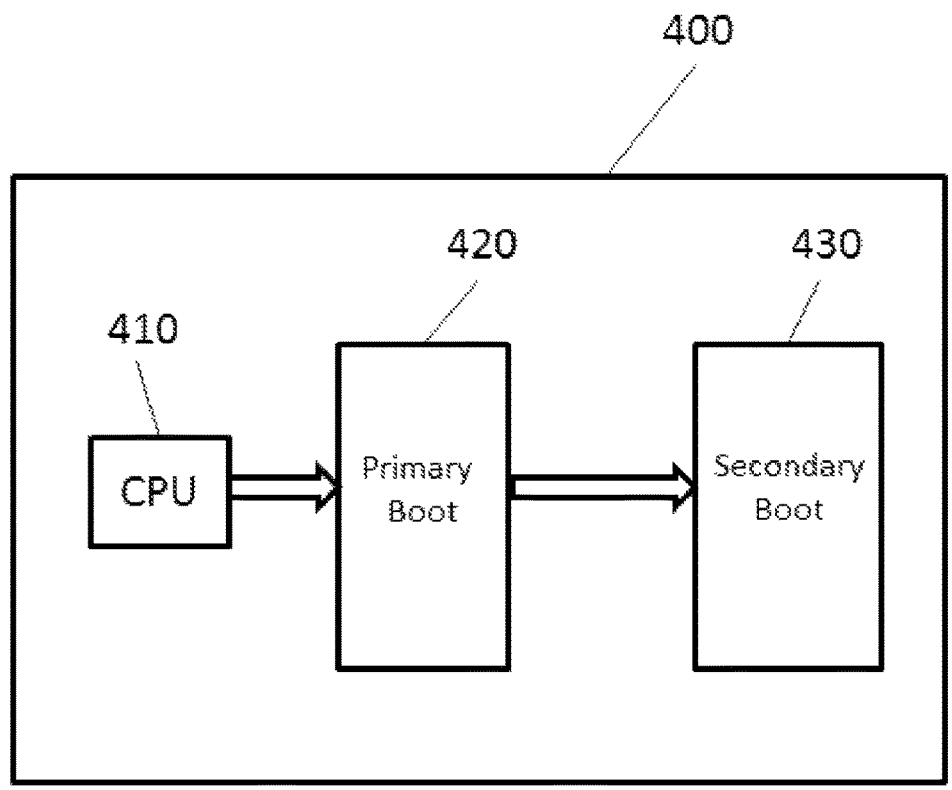
FIG. 4 is an exemplary process of an embodiment of the disclosure, in which a CPU is shown accessing a primary boot followed by a secondary boot.

FIG. 4 is an exemplary view of a dual boot system for a computer system 400 according to an embodiment of the disclosure, in which the CPU 410, either with or without a CPLD (not shown), commences the primary boot 420. The CPU 410 determines that the secondary boot 430 is available.

In one embodiment, the primary boot 420 continues, and a variety of peripheral devices (not shown) for the computer system 400 may be activated. At the conclusion of the primary boot 420, the computer system 400 resets. A second boot sequence commences with the primary boot 420, and CPU 410 determines that the secondary boot 430 is available. After detecting the secondary boot 430, the primary boot 420 is halted, and the secondary boot 430 initializes. Since the primary boot 420 ended previously, the variety of peripheral devices activated during the primary boot 420 can remain activated for the secondary boot 430, shortening the duration of the secondary boot 430.

As described previously above, the secondary boot 430 is typically a customer-modified boot, whereas the primary boot 420 is typically a locally-protected boot. The secondary boot 430 completes, though since the variety of peripheral devices were activated during the first boot sequence using the primary boot 420, the secondary boot 430 does need to complete these tasks as second time; as a result the secondary boot 430 can occur more efficiently and quickly than if the same variety of peripheral devices were activated during the secondary boot 430. In another embodiment, the primary boot 420 is halted, and the CPU 410 switches to the secondary boot 430. The secondary boot 430 commences, and during the secondary boot sequence a variety of peripheral devices can be activated. In this embodiment, the CPU 410 does not return to the primary boot 420 unless the secondary boot fails.

In one embodiment, the primary boot 420 commences automatically, without user input. The CPU 410 determines the status of the secondary boot 430 and can switch to the secondary boot 430 or return to the primary boot 420 depending upon the status of the secondary boot 430. Alternatively, the user can override the CPU 410 by using a hardware jumper or using an input device to enter instructions (such as a hot key) to instruct the CPU 410 to boot using either the primary boot 420 or the secondary boot 430.

Figure 5:
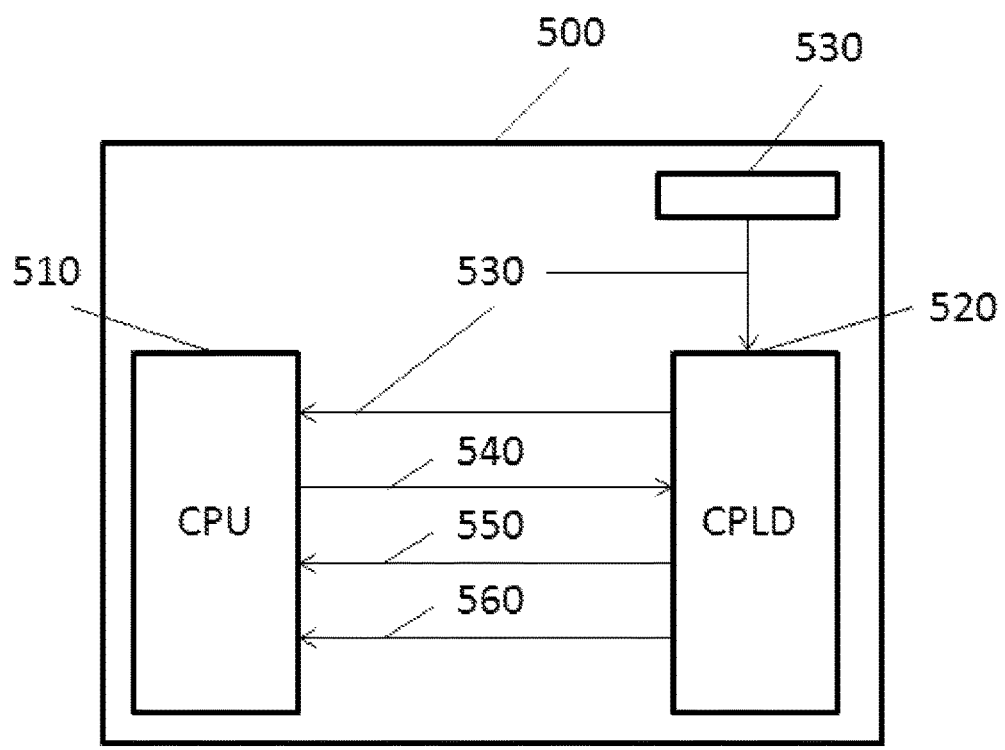
FIG. 5 is an exemplary diagram of an embodiment of the disclosure, in which a CPU setting value is sent to a CPLD in communication with a CPU.

As shown in FIG. 5, an embodiment of an exemplary computer system 500 arrangement is shown. The CPU 510 is connected to the CPLD 520. The CPU setting value signal pathway 530 is provides a value to the CPLD 520. The CPLD 520 determines which boot runs during the next boot sequence, such as the primary boot or secondary boot (not shown). If the CPU setting value signal pathway 530 contains, for example, a "Yes" value such as a binary "0", the CPLD 520 can instruct the CPU 510 to boot using the primary boot. If, on the other hand, the CPU 510 setting value signal pathway 530 contains, for example, a "No" value such as a binary "1", the CPLD 520 can instruct the CPU 510 to boot using the secondary boot. It should be noted that there can be additional values and additional boot sequences, such as but not limited to a tertiary boot that may or may not be different from the primary or secondary boots in this embodiment. The CPLD 520 communicates the CPU setting value signal pathway 530 to the CPU 510 as described above. The CPU 510 communicates to the CPLD 520 a confirmation signal 540, either CPU_BOOT_OK_Y or CPU_BOOT_OK_N. (CPU_BOOT_OK_Y can confirm CPU boot ok either from primary boot and secondary boot. If signal 540 is CPU_BOOT_OK_N, CPU 510 cannot be boot successfully either from primary boot and secondary boot.) Another signal, PLD_SYS_RST 550 is communicated from the CPLD 520 to the CPU 510. If the signal is a particular determined value, the CPLD 520 may reset the CPU 510; if the signal is another particular determined value, the CPLD 520 may not reset the CPU 510. Additional I2C communication 560 can occur between the CPU 510 and the CPLD 520 to activate peripheral devices or perform other tasks.

Figure 6:
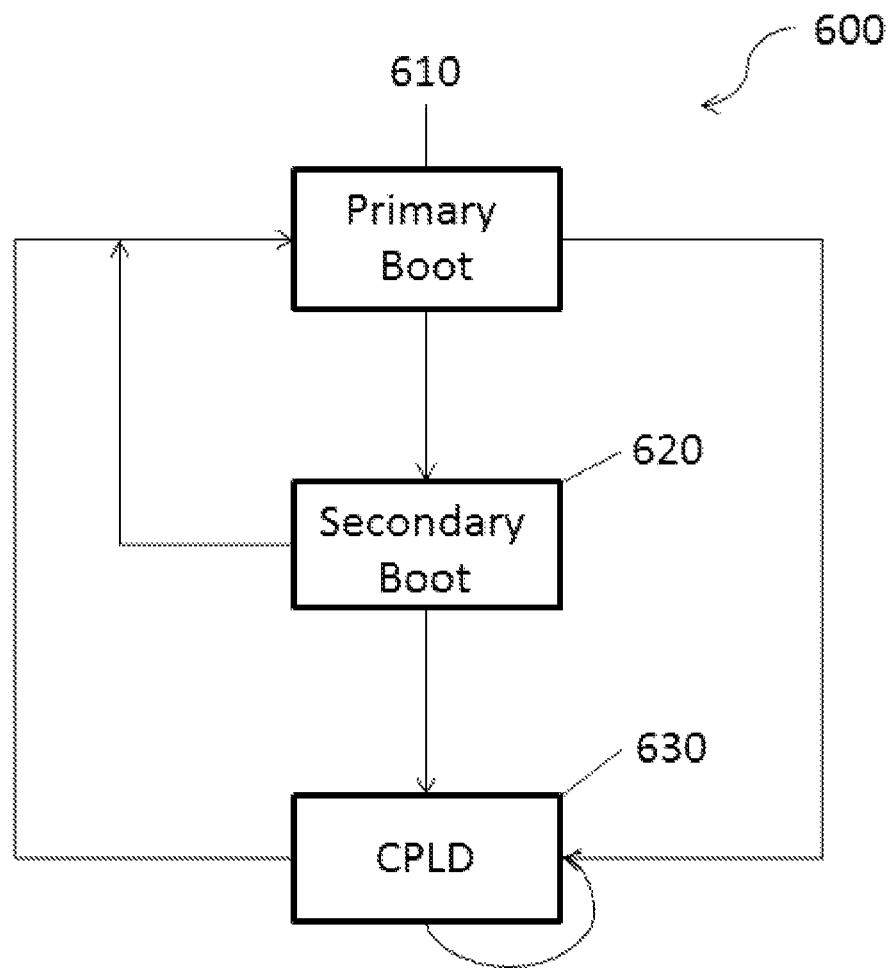
FIG. 6 is an exemplary diagram of an CPLD booting flow chart.

In FIG. 6, an exemplary flow chart 600 of a CPLD boot process for a computer system is shown. Typically, the CPLD 630 commences a primary boot 610 after the power of to a computer system is turned on. If the primary boot 610 is functional, then the primary boot 610 code is set to BOOT_OK=L (binary "0") and this signal is sent to the CPLD 630. The CPLD 630 then switches to monitor status, checking the status of the primary boot 610 at each subsequent boot cycle. If the primary boot 610 does not function or the BOOT_OK signal did not clear (high (H, binary "1") and not low (L, binary "0")), the CPLD 630 t holds the CPU (not shown) reset and changes the boot strap value, after which the release is reset and the secondary boot 620 commences. If the secondary boot 620 can boot the computer system, the secondary boot 620 code is set to BOOT_OK=L, and the CPLD 630 then switches to monitor status. If the secondary boot 620 is not functional (cannot boot the computer system) or the BOOT_OK signal did not clear (in other words, still (H) high)), the CPLD 630 holds the CPU reset and changes the boot strap value, after which the release is reset and the primary boot 610 commences. The CPLD 630 monitors whether or not a user commences a reset function (change BOOT_OK signal from low (L, "0") to high (H, "1")) and commences the primary boot 610.

Figure 7:
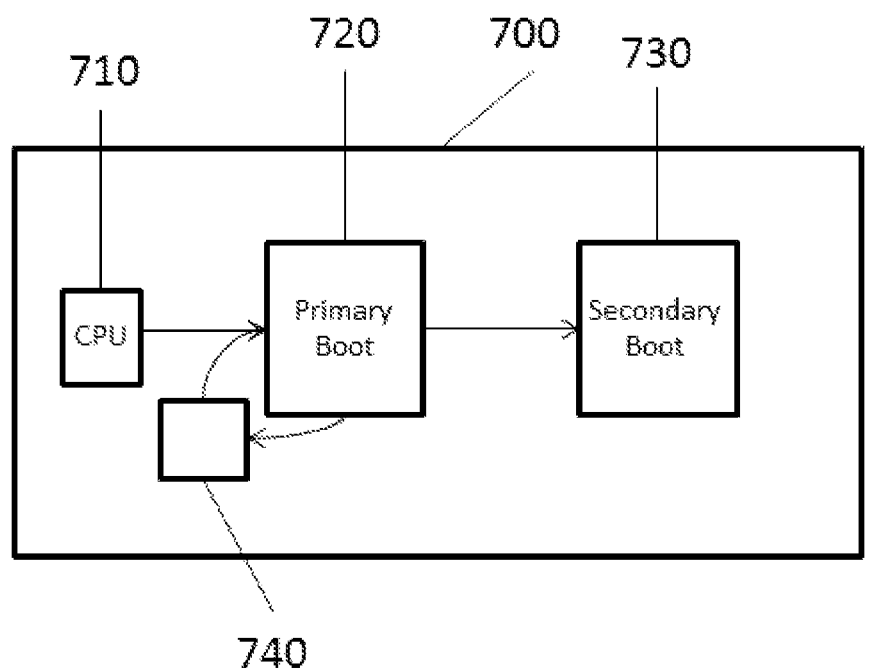
FIG. 7 is an exemplary diagram of an embodiment of the disclosure, in which a CPU is shown accessing a primary boot followed by a secondary boot.

In FIG. 7, an exemplary flow chart 700 of a primary boot and secondary boot process for a computer system is shown. Typically, after the CPU 710 completes POST (Power On Self-Test), the primary boot 720 initializes. If the CPU 710 then determines that the secondary boot 730 is also not present or available, the CPU 710 can display options 740 on a screen. A first request can be a request to enter a diagnostic code, such as keying "CTRL+D". A second request can be a request to recover the backup version of the secondary boot 730, such as keying "CTRL+R". In this second request, additional information may be required from the user, such as a password or security key. As described above, the password or security key may be available from the manufacturer or other source.

Figure 8:
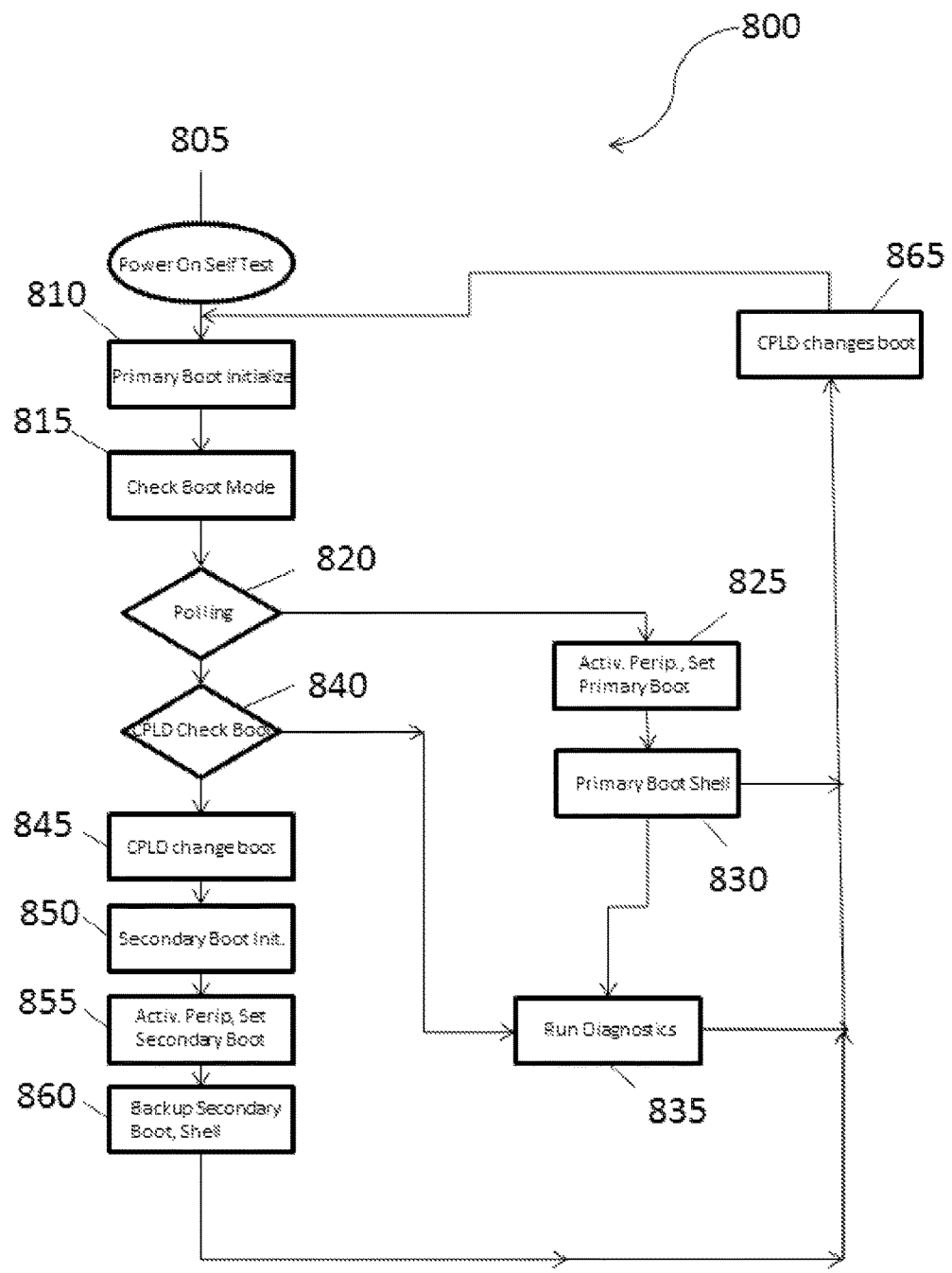
FIG. 8 is an exemplary process flowchart of an embodiment of the disclosure, in which a primary boot is selected followed by a secondary boot.

In FIG. 8, an exemplary flow chart 800 of a primary boot and secondary boot process for a computer system is shown. The first step 805 is the Power On Self-Test (POST) to activate the computer system. In step 810 the primary boot initializes, which includes step 815, checking the boot mode, either diagnostic or secondary boot based upon user input. Step 820 provides a polling time. During the polling time, a password or security key can be entered, in which case the process moves to step 825 which activates any peripheral devices connected to the computer system and boot shell runs in step 830 that may include other code and/or commands from the user. After step 830 is complete, the user may reboot or reset to proceed. After step 830, there are two options. A first option involves step 835, that runs a diagnostic code, then the computer system is reset and the process moves to step 865, where the CPLD changes the booting to the secondary boot, before returning to step 810. A second option bypasses the diagnostic code in step 835 and proceeds directly to step 865.

In step 840, if an incorrect password or security key is entered, either a diagnostic mode is entered by proceeding to step 835, or a normal mode is entered by proceeding to step 845, in which the CPLD changes to the primary boot to the secondary boot, which initializes in step 850. In step 855, various peripheral devices can be connected to the computer system, such as those unique to the secondary boot.

In alternative embodiment, the secondary boot is backed up in a partition of the primary boot. The backup can include a secondary boot backup and/or a secondary validated boot backup, as described above. The secondary boot shell runs in step 860, after which the computer system is reset, starting from the primary boot of step 810.

Figure 9:
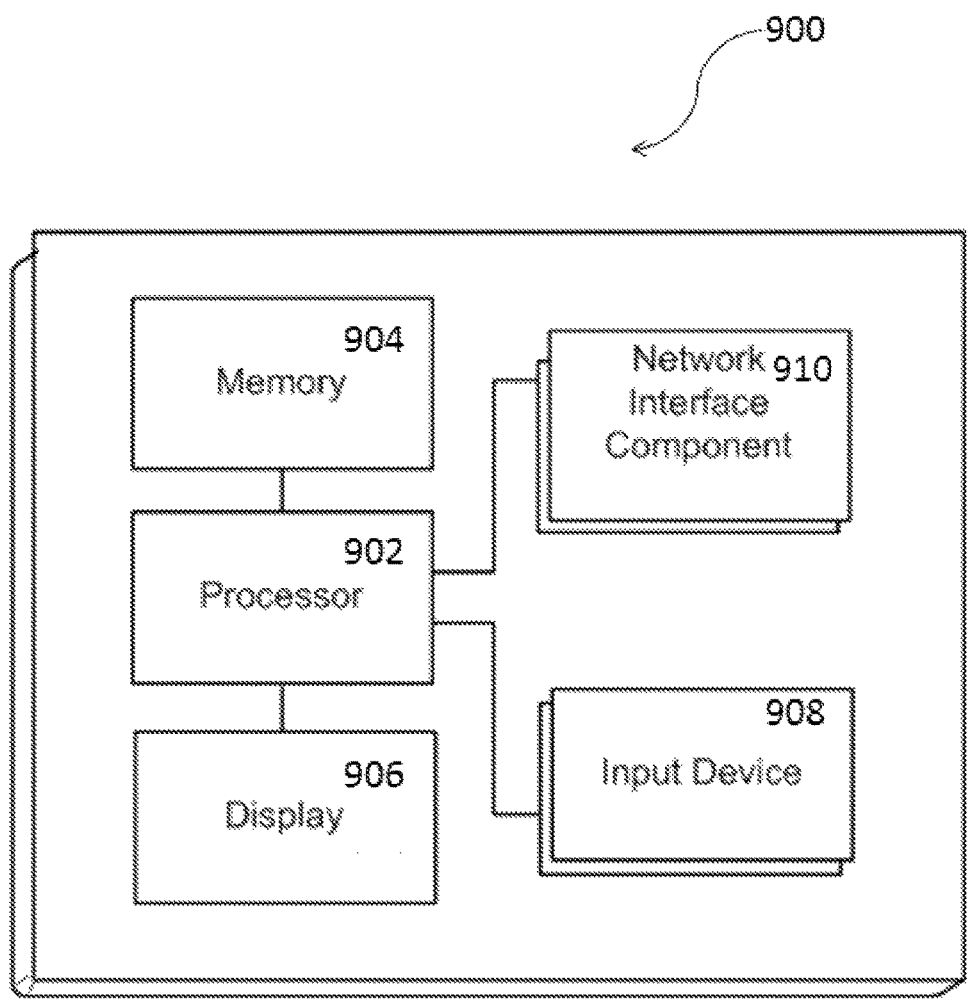
FIG. 9 is an exemplary computer system of an embodiment of the disclosure, in which the computer system contains a pair of boots in memory.

FIG. 9 illustrates a logical arrangement of a set of general components of an example computing device 900. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically can include some type of display element 906, such as a touch screen or liquid crystal display (LCD), although devices such as portable media players might convey information via other means, such as through audio speakers. As discussed, the device in many embodiments can include at least one input element 908 able to receive conventional input from a user. This conventional input can include, for example, a push button, touch pad, touch screen, keyboard, mouse, keypad, or any other such device or element whereby a user can input a command to the device. In some embodiments, the computing device 900 of FIG. 9 can include one or more network interface elements 910 for communicating over various networks, such as a Wi-Fi, Bluetooth, RF, wired, or wireless communication systems. The device in many embodiments can communicate with a network, such as the Internet, and may be able to communicate with other such devices.

Each computing device typically can include an operating system that provides executable program instructions for the general administration and operation of that device and typically can include computer-readable medium storing instructions that, when executed by a processor of the server, allow the computing device to perform its intended functions. Suitable implementations for the operating system and general functionality of the servers are known or commercially available and are readily implemented by persons having ordinary skill in the art, particularly in light of the disclosure herein.

Various embodiments discussed or suggested herein can be implemented in a wide variety of operating environments, which in some cases can include one or more user computers, computing devices, or processing devices that can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments where the computing device includes a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically can include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A computer system, comprising:
   a processor;
   a complex programmable logic device (CPLD);
   a locally protected primary boot;
   a locally modifiable secondary boot, wherein the CPLD is connected to the processor, and configured to control the processor with regard to selecting either the locally protected primary boot or the locally modifiable secondary boot, wherein the locally protected primary boot and the locally modifiable boot are individually partitioned, and the way the locally protected primary boot being partitioned is different from the way the locally modifiable boot being partitioned;

a computer-readable memory storing instructions which, when executed by the processor, causes the processor to perform operations comprising:
commencing a first boot sequence for the computer system with the primary boot;
restarting the computer system and commencing, in response to the restarting, a second boot sequence with the locally modifiable secondary boot;
if the second boot sequence with the secondary boot is successful, storing a copy of the secondary boot in a partition of the primary boot as one of a ONIE u-boot code, a u-boot environment, or a kernel code; and
if the second boot sequence with the secondary boot fails, restarting the computer system and re-commencing a third boot sequence with the primary boot.

2. The system of claim 1, the operations further comprising storing a backup of the secondary boot in a partition of the primary boot.

3. The system of claim 2, wherein the partition of the primary boot storing the backup of the secondary boot is secured with a security key.

4. The system of claim 2, wherein the computer system further comprises a second backup of the secondary boot.

5. The system of claim 4, wherein the second backup of the secondary boot is tested to insure that the second backup of the secondary boot can boot the computer system before being stored in the partition of the primary boot.

6. The system of claim 4, wherein the second backup of the secondary boot is locally protected.

7. The system of claim 5, the operations further comprising:
in response to failing to complete the second boot sequence with the secondary boot, restarting the computer system and re-commencing a third boot sequence with the second backup of the secondary boot.

8. The system of claim 1, further comprising an automatic boot system wherein a selection is made by the processor between the primary boot and the secondary boot based at least in part on a command while in an automatic boot mode.

9. The system of claim 1, further comprising a jumper to select either the primary boot or the secondary boot.

10. The system of claim 1, wherein the primary boot is upgradable via a computer network.

11. A method of booting a computer system, comprising:
commencing a first boot sequence for a computer system with a primary boot;
restarting the computer system and commencing, in response to the restarting, a second boot sequence with a secondary boot, wherein the primary boot and the secondary boot are coupled to a processor that is connected to a complex programmable logic device (CPLD), the CPLD configured to control the processor with regard to selecting either the primary boot or the secondary boot, wherein the primary boot and the secondary boot are individually partitioned, and the way the primary boot being partitioned is different from the way the secondary boot being partitioned;
if the second boot sequence with the secondary boot is successful, storing a copy of the secondary boot in a partition of the primary boot as one of a ONIE u-boot code, a u-boot environment, or a kernel code; and
if the second boot sequence with the secondary boot fails, restarting the computer system and re-commencing a third boot sequence with the primary boot.

12. The method of claim 11, further comprising storing a backup of the secondary boot in a partition of the primary boot.

13. The method of claim 12, further comprising securing the backup of the secondary boot in the partition of the primary boot using a security key.

14. The method of claim 13, further comprising a second backup of the secondary boot.

15. The method of claim 14, wherein the second backup of the secondary boot is a tested backup.

16. The method of claim 15, further comprising storing the second backup of the secondary boot in the partition of the primary boot.

17. The method of claim 16, further comprising securing the second backup of the secondary boot in the partition of the primary boot using at least one security key.

18. The method of claim 12, wherein in response to failing to complete the second boot sequence with the secondary boot, restarting the computer system and re-commencing the third boot sequence with the backup of the secondary boot.

19. The method of claim 14, wherein in response to failing to complete the second boot sequence with the backup of the secondary boot, restarting the computer system and re-commencing the third boot sequence with the second backup of the secondary boot.

20. The method of claim 11, further comprising upgrading the primary boot via a network.

* * * * *